Figure 1:
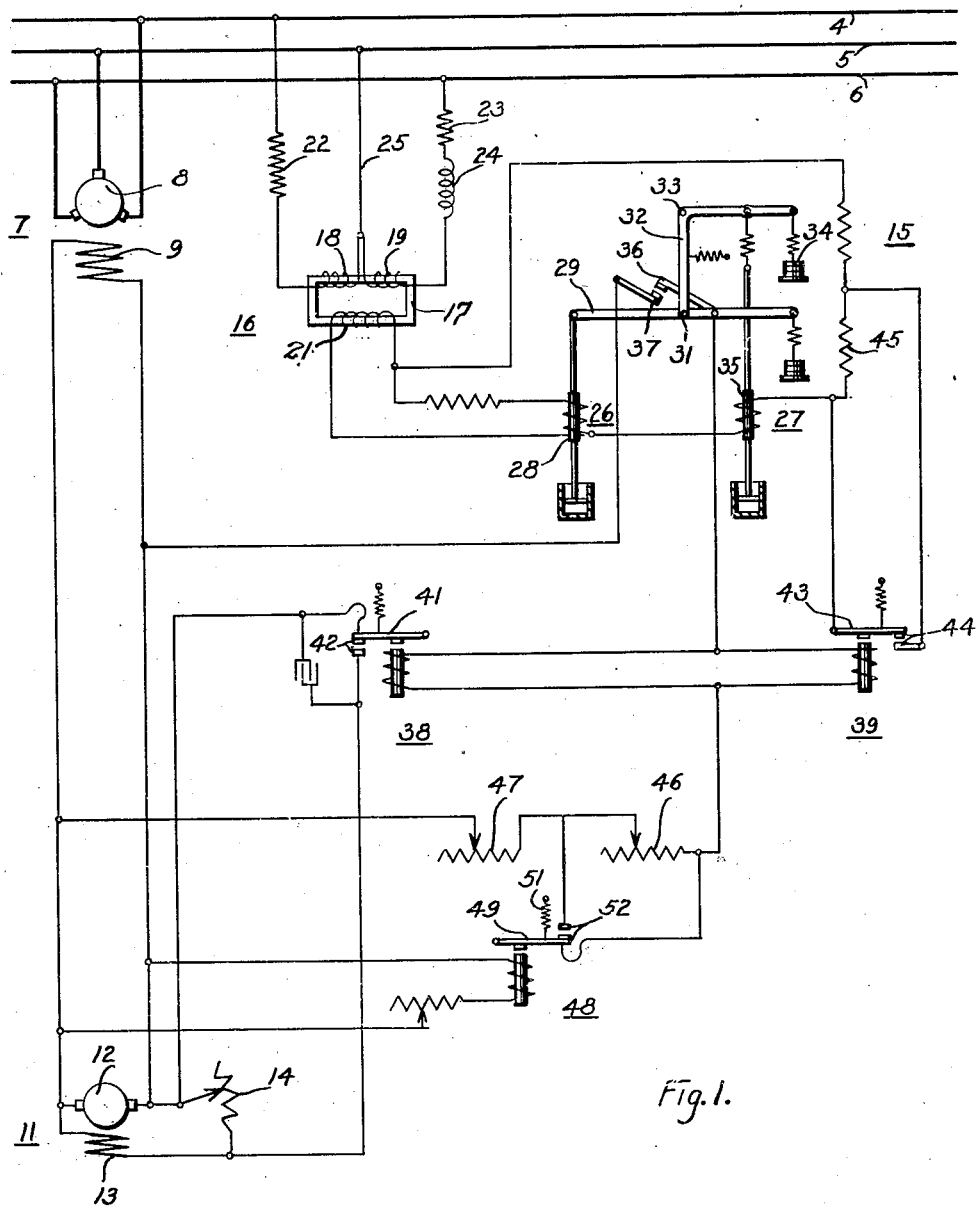

Dec. 29, 1925.  
R. D. EVANS  
REGULATOR SYSTEM  
Filed April 12, 1921   2 Sheets-Sheet 1

1,567,581

WITNESSES:  
John W. Whiting  
M. Theodore Simmons

INVENTOR  
Robert D. Evans.  
BY  
Wesley G. Carr  
ATTORNEY

Dec. 29, 1925.

R. D. EVANS 1,567,581

REGULATOR SYSTEM

Filed April 12, 1921

2 Sheets-Sheet 2

WITNESSES:
John W. Whiting
M. Theodore Simmons

INVENTOR
Robert D. Evans.
BY
Wesley G. Carr
ATTORNEY

Patented Dec. 29, 1925.

1,567,581

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed April 12, 1921. Serial No. 460,782.

*To all whom it may concern:*

Be it known that I, ROBERT D. EVANS, a citizen of the United States, and a resident of Pittsburgh, in the county of Allegheny and State of Pennsylvania, have invented a new and useful Improvement in Regulator Systems, of which the following is a specification.

My invention relates to regulator systems and has special relation to regulator systems that are adapted to accurately function when connected to either a balanced or an unbalanced circuit.

One object of my invention is to provide means for energizing regulators in accordance with one or more symmetrical phase-sequence components of one or more of the electrical quantities of the circuit to which said regulators are connected.

Another object of my invention is to provide a static system whereby voltage-regulator apparatus of well-known construction may be employed to accurately govern the excitation of a variable source of supply when connected to an unbalanced polyphase system as well as when said system is balanced.

A further object of my invention is to provide a system of the above-indicated character which shall be efficient and accurate in its operation and inexpensive in construction.

In practicing my invention, I utilize the broad principles of segregating the symmetrical components of the unbalanced quantities of an electrical system, disclosed in the copending application of Charles Le G. Fortescue, Lewis W. Chubb and Joseph Slepian, Serial No. 358,373, filed Feb. 13, 1920, and assigned to the Westinghouse Electric & Manufacturing Company, wherein it is also pointed out that power consumed as a single-phase load unbalances a polyphase system and reduces the capacity of the generator and feeder circuits.

It has been discovered that any unbalanced polyphase system of electrical quantities may be resolved into two or more balanced or symmetrical systems. These quantities, for example, may be resolved into a zero-phase-sequence component, a positive-phase-sequence component, and a negative-phase-sequence component. In a three-phase, three-wire system, the zero-phase-sequence component of an unbalanced system is the same as in a balanced polyphase system.

While the principles of the present invention are illustrated as applied to a three-phase circuit, it will be understood that the same principles apply with equal force to other polyphase circuits. It should also be borne in mind that the herein described apparatus and the particular connections thereof function accurately on a balanced polyphase circuit and, in addition, function more accurately than heretofore when the polyphase circuit becomes unbalanced. In other words, the herein described method of connecting the regulators permits of their accurate operation, irrespective of the phase to which the potential transformers are connected, so that the regulator now functions in accordance with the best balanced average of the unbalanced components of the polyphase circuit. Or, stated another way, the regulator now operates regardless of the load condition of the circuit to which the regulator is connected.

Various means for segregating the symmetrical components of an unbalanced polyphase system may be employed, but the broad principles of my invention, as applied to voltage-regulating apparatus, are indicated in the accompanying drawings, wherein—

Figure 2:
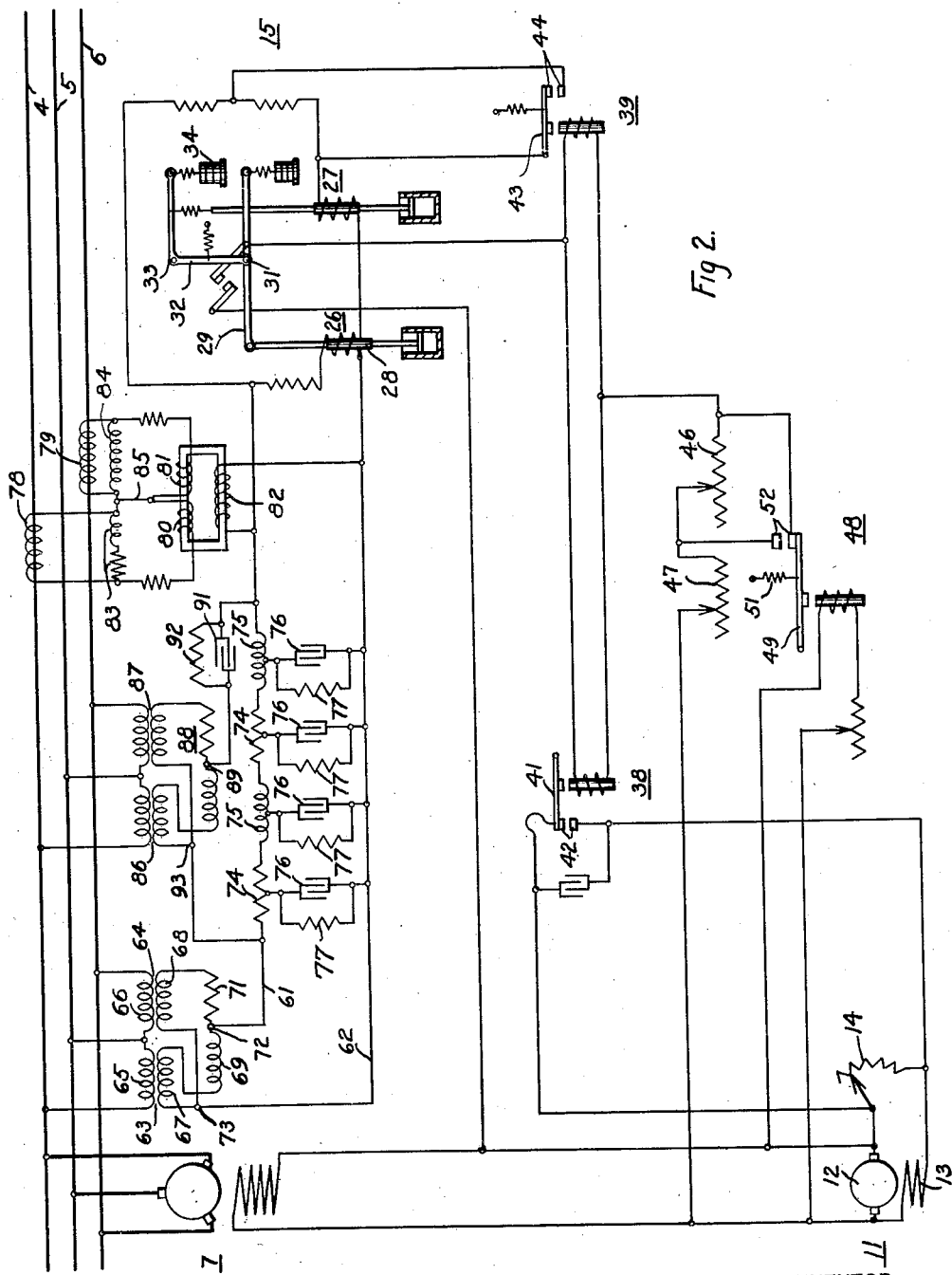

Fig. 1 is a diagrammatic illustration of a voltage regulator actuated in accordance with the positive-phase-sequence-voltage component, and Fig. 2 is a diagrammatic illustration of a voltage-regulator system actuated in accordance with the positive-phase-sequence components and utilizing a compensator, so that the regulation is in accordance with the power at a distant point, for example, the load point.

Referring to Fig. 1, a polyphase circuit comprises conductors 4, 5 and 6, and has connected thereto a generator 7, comprising an armature 8 and a field-magnet winding 9. Field-magnet winding 9 has connected thereto an exciter machine 11 having an armature 12 and a field-magnet winding 13. The field-magnet winding 13 has an adjustable rheostat 14 in circuit therewith which is controlled by regulating apparatus 15 of well-known construction, and which will be described hereinafter more in detail.

The regulator 15 is actuated in accordance with the positive-phase-sequence component of the unbalanced voltage of the polyphase circuit through the transformer 16, comprising a core member 17, two primary windings 18 and 19, and a secondary winding 21. The primary winding 18 is connected to the conductor 4 through a resistor 22. The primary winding 19 is connected to the conductor 6 through a resistor 23 and a reactor 24. The primary windings 18 and 19 are arranged in opposition to each other and the common terminals thereof are connected to the conductor 5 through wire 25. The resistor 22 is of such high resistance that the current traversing the winding 18 is in phase with the voltage across the conductors 4 and 5. On the other hand, the impedance of the reactor 24 and resistor 23 is such that the current traversing the winding 19 lags 60° behind the voltage across the conductors 5 and 6.

With this arrangement, a magnetic flux is induced in the core member 17 of the transformer 16 to thereby cause current to traverse the secondary winding 21 when a balanced polyphase voltage of predetermined phase sequence exists upon the supply circuit. Also, the impedance of the resistor 22 and the impedance of the circuit comprising the resistor 23 and the reactor 24 is such that no magnetic flux interlinks with the secondary-winding circuit when a balanced polyphase voltage of other phase sequence is applied to the circuit.

In other words, in a three-phase, three-wire system, the voltage of the circuit may be resolved into a balanced positive, or direct-rotational, phase-sequence component, and a balanced negative, or counter-rotational, phase-sequence component.

With the connections shown in Fig. 1, the resulting flux interlinking the winding 21 and, consequently, the current traversing this winding, is proportional to the balanced direct-rotational component of the unbalanced voltage impressed on the supply circuit. However, apparatus 16 will not indicate the balanced counter-rotational voltage component, and, hence, the regulator will be unaffected thereby.

In order to have the current traversing the secondary winding 21 proportional to the counter-rotational, or negative-phase-sequence component of the unbalanced voltage impressed on the supply circuit, it would only be necessary to reverse the connections of the primary winding 19 so that the circuit comprising the resistor 23 and the reactor 24 would be connected to the conductor 5, and the wire 25, leading from the common terminals of the windings 18 and 19, would be connected to the conductor 6.

In order to govern the excitation of the main generator 7 in accordance with this positive-phase-sequence component energization, main and auxiliary control magnets 26 and 27, respectively, of the regulator apparatus 15, are connected to the secondary winding 21 of the transformer 16 to be energized in accordance with the voltage impressed upon this winding. The main control magnet 26 has a core armature 28, connected to one end of a floating lever 29 which is pivoted at 31 to a bell-crank lever 32. Bell-crank lever 32 is, in turn, pivoted at 33 and has secured to the free arm thereof a counter-balancing weight 34. Also secured to this arm of the bell-crank lever 32 is the core armature 35 of the auxiliary control magnet 27. The floating lever 29 carries a vibrating contact member 36 which co-operates with a stationary contact member 37 to complete an energizing circuit to the relays 38 and 39.

Relay 38 comprises, in part, an armature 41, carrying one of the contact members 42 that are included in a shunt circuit for the adjustable rheostat 14 which is connected in circuit with the field-magnet winding 13 of the exciter machine. Relay 39 comprises, in part, an armature 43 carrying one of the contact members 44 that are included in a shunt circuit for resistor 45 which is connected in circuit with the coil of the auxiliary control magnet 27. Thus, when this circuit is completed, the energization of the winding 27 is varied to cause a separation of the contact members and thereby insure the vibratory action of the main contact members 36 and 37. Since the regulator 15 has a vibratory action, the operating relays 38 and 39 will likewise have a vibratory action and, therefore, the effective values of the rheostat 14 and the resistor 45, which are in circuit with the field-magnet winding 13 and the auxiliary control magnet 27, respectively, will be controlled in accordance with the operation of the main contact members. These contact members are, in turn, governed in accordance with the positive-phase-sequence-component of the unbalanced voltage of the supply circuit.

The energizing circuit for the operating relays 38 and 39 includes resistors 46 and 47. Means are herein shown for increasing the range of exciter voltage and also the operating range of the regulator mechanism, such means comprising an electromagnet 48 which is also energized in accordance with the exciter voltage. Electromagnet 48 has a co-operating armature 49 biased to the closed position by a spring 51, said armature carrying one of the contact members 52 which are included in a shunt circuit for the resistor 46. Accordingly, when the exciter voltage drops below a predetermined value, a shunt circuit will be completed for the resistor 46 which will thereby change the energization of the operating relays 38 and 39. Consequently, the range of operation of the regulator will be extended and this condition, in turn, will extend the range of exciter voltage.

Referring to Fig. 2, a system of regulation is illustrated wherein the regulator is applied to a polyphase system having impedance characteristics that cause a variation between the effective potential at the load and that at the generator. The regulator may be operated in accordance with a symmetrical component of the voltage of the unbalanced polyphase circuit at some point situated at a distance from the regulator, such as the load point, while the regulator may be located at the central power station. This may be accomplished by the use of well-known compensating apparatus that will approximately indicate the impedance characteristics of the supply circuit in a local circuit connected to the regulating apparatus.

However, such compensating apparatus on an unbalanced system also requires that the phase-sequence component of the voltage of the unbalanced circuit be taken into consideration in order that the local circuit at the power station may accurately indicate the true condition at the load point.

In illustrating the means for indicating the voltage and current-phase-sequence components, different apparatus from that illustrated in Fig. 1 is shown in Fig. 2. However, the results obtained are similar, and the apparatus illustrated in Fig. 2 will indicate the positive-phase-sequence components of the unbalanced circuit.

In so far as practicable, the same reference numerals will be used in Fig. 2 to indicate similar apparatus to that illustrated in Fig. 1.

A supply circuit, comprising conductors 4, 5 and 6, has connected thereto the main generator 7 in a manner similar to that indicated in Fig. 1.

The main generator 7 has the exciter machine 11 connected thereto and is controlled through the regulating apparatus 15. A local circuit, comprising conductors 61 and 62, is adapted to be energized in accordance with the positive-phase-sequence component of the unbalanced voltages of the supply circuit through transformers 63 and 64. The primary windings 65 and 66 are connected to supply conductors 4, 5 and 6, as illustrated. The secondary windings 67 and 68 are connected to a circuit comprising impedance devices 69 and 71 the phase angles of which differ by 60°. While the impedance device 71 is shown as non-inductive and the device 69 as inductive, such a relation is not essential, as any impedance devices may be employed the phase angles of which differ by 60°.

The local circuit is connected to a point 72 intermediate the impedance devices 69 and 71, and a point 73, which is intermediate the secondary windings 67 and 68 of the transformers 63 and 64, respectively. The winding 67 is reversed in its connection in order to so shift the phase angular relation of the voltages applied to the impedance devices 21 and 22 that the same may be 60° out of phase with each other, instead of 120° out of phase. This connection thereby eliminates the necessity of using a condensive reactance and permits the impedance devices 21 and 22 to be relatively small in size. Accordingly, standard transformer apparatus may be used.

The points 72 and 73 represent the same potential when a balanced voltage is applied to the circuit, but they are of different potentials when an unbalanced voltage is applied to the circuit, and, accordingly, conductors 61 and 62 are traversed by current proportional to one symmetrical component of an unbalanced voltage. With the illustrated connections, the local circuit is supplied with a current proportional to the balanced positive-phase-sequence component of voltage. However, as heretofore pointed out, in order to indicate the negative component, it is only necessary to reverse either the relations of the impedance devices 69 and 71 or the transformer connections.

The herein described arrangement provides for the simplest form of apparatus for obtaining the symmetrical components of the unbalanced polyphase quantities and for impressing upon the local circuit a potential which is representative of the delivered potential of the supply circuit.

The means for indicating the voltage at the load point are here shown as sections of resistance 74 and reactance 75 alternately arranged in series-circuit relation in the conductor 61. Connected in parallel-circuit relation between the middle point of each resistor and reactor and the conductor 62, are a condenser 76 and a resistor 77 of any suitable capacity. The resistor 77 may be either reactive or ohmic or a combination of the two, as may be required in any particular case. Also, any other combination of the impedance devices may be made in the local circuit in accordance with the supply-circuit conditions between the generator and the load point.

The illustrated resistors, reactors and condensers reproduce, in the local circuit, the reactance, resistance and distributed capacitance and distributed losses in the supply circuit, and this reproduction may be carried to any desired degree of accuracy, in accordance with now well-known principles.

The local circuit is supplied with current of the same phase-sequence component as the indicated component of the unbalanced voltage of the supply circuit through series transformers 78 and 79 which are associated with conductors 4 and 6 and are connected to one terminal of each of the primary windings 80 and 81 of a transformer device which also comprises a secondary winding 82.

Connected in series-circuit relation across transformers 78 and 79, respectively, are impedance devices 83 and 84. The common terminals of the windings 80 and 81 are connected to a point between the impedance devices 83 and 84 by means of a conductor 85. In order to preserve the proper phase relations between the voltage and current devices, the impedance device 83 has such a value as to cause a 30° phase displacement, and impedance device 84 has such a value as to cause a 90° phase displacement in the vector relations of the currents.

With the above connections, the secondary winding 82 is traversed by a flux proportional to the balanced positive-phase-sequence component of the unbalanced currents of the supply circuit.

The apparatus just described will not be affected by the negative-phase-sequence-current component. However, if it is desired to indicate that component, it will only be necessary to reverse the relations of impedance devices 83 and 84 or to locate the secondary winding of transformer 79 upon supply conductor 5.

The local circuit, as thus far described, will not have the desired indication for the reason that a current proportional to, and in step with, the component of the line current is already passing through the resistors 74 and the reactors 75 that is due to the distributed capacitance and losses of the supply circuit. Consequently, the effect of this current on the reactors and resistors must be neutralized. This result is accomplished by means of a set of transformers 86 and 87 and a network 88, similar in all respects to the transformers 63 and 64, and the associated network heretofore described in connection therewith.

Connected in parallel relation between the point 89, similar to the point 72 above described, and one side of the series of impedance devices 74 and 75, are a condenser 91 and a resistor 92. Point 93, similar to point 73, above described, is connected to the opposite side of the series of impedance devices 74 and 75. The arrangement of the transformers 86 and 87 is such that the current through the resistors 74 and the reactors 75 is in the reverse direction to that component of the current originally flowing through the resistors and reactors, by reason of the connection to the transformers 63 and 64.

From the foregoing, it will be apparent that the potential at the outer terminals of the local circuit comprising conductors 61 and 62 is an indication of the potential existing at the load point and, in the present application, this indication is the positive-phase-sequence component of the load-point potential. Consequently, if a regulator is connected to the outer terminals of the local circuit, it will be operated in accordance with the postive-phase-sequence component of the unbalanced voltage at the load point. In the system illustrated in Fig. 2, the regulating apparatus 15 is operated in this manner by having the main control magnet 26 and the auxiliary control magnet 27 connected across the conductors 61 and 62 to be operated in accordance with the potential thereof.

From this point, the construction and operation of the regulating apparatus 15, the operating relays 38 and 39 and the means 48 for determining the range of operation is similar in all respects to the construction and operation of the regulator described above in connection with Fig. 1.

Modifications in the system and arrangement and location of parts may be made within the spirit and scope of my invention, and such modifications are intended to be covered by the appended claims.

I claim as my invention:—

1. In a regulator system for maintaining a substantially constant voltage upon a polyphase supply circuit, the combination with a regulator, of means connected between the regulator and the circuit whereby the regulator is energized in accordance with one symmetrical component of a polyphase electrical quantity of said circuit.

2. In a regulator system for maintaining a substantially constant voltage upon an unbalanced supply circuit, the combination with a vibratory regulator, of static means connected between the regulator and the circuit whereby the regulator is actuated in accordance with one symmetrical component of a polyphase electrical quantity of said circuit.

3. In a regulator system for maintaining a substantially constant voltage upon a polyphase supply circuit, the combination with a vibratory regulator, of static means connected between the regulator and the supply circuit whereby the regulator is actuated in accordance with the positive-phase-sequence component of a polyphase electrical quantity.

4. In a regulator for maintaining a substantially constant voltage upon an unbalanced polyphase supply circuit, the combination with means for determining the range of operation thereof, of static means connected between the regulator and the circuit whereby the regulator is actuated in accordance with the positive-phase-sequence component of a polyphase electrical quantity.

5. In a regulator system for maintaining a substantially constant voltage upon a polyphase supply circuit, the combination with a regulator, of means connected between the regulator and the circuit whereby the regulator is actuated in accordance with the negative-phase-sequence component of the polyphase current traversing the circuit.

6. In a regulator system for maintaining a substantially constant voltage upon an unbalanced supply circuit, the combination with a vibratory regulator, of static means connected between the regulator and the supply circuit whereby the regulator is actuated in accordance with the negative-phase-sequence component of the polyphase current traversing the circuit.

7. In a regulator system for maintaining a substantially constant voltage upon a balanced or unbalanced supply circuit, the combination with a regulator, of means connected between the regulator and the circuit whereby the regulator is actuated in accordance with a quantity which is one of a set of symmetrical quantities into which the unbalanced quantities of the circuit may be resolved.

8. In a regulator system for maintaining a substantially constant voltage upon a polyphase supply circuit, the combination with a regulator and means for determining the range of operation thereof, of means connected between the regulator and the circuit whereby the regulator is actuated in accordance with a quantity which is one of a set of symmetrical components into which the unbalanced voltages of the circuit may be resolved.

9. A regulator system for a polyphase circuit, which includes voltage-indicating means comprising a plurality of resistors and reactors connected to the circuit and a transformer, and regulating apparatus comprising vibratory contact members, control magnets therefor, operating relays controlled thereby, and means for determining the range of operation of said regulating means.

10. A voltage regulator adapted to be connected to a balanced or an unbalanced circuit, said regulator comprising electro-responsive means, and means connected to said circuit for energizing said electroresponsive means in accordance with one symmetrical component of an electrical quantity of said circuit.

11. In a system for maintaining a constant voltage upon a polyphase supply circuit, the combination with a dynamo-electric machine connected to said circuit, and an exciter therefor, of a regulator for controlling said exciter, and apparatus comprising a transformer and a plurality of impedance devices in circuit therewith for energizing said regulator in accordance with the positive-phase-sequence component of the unbalanced voltages of the supply circuit.

12. In an electrical system, the combination with an unbalanced supply circuit, a local circuit in which is reproduced the electrical conditions of said supply circuit between a given point and the load point, and a regulator connected to said local circuit, of means for impressing upon said circuit one symmetrical component of the unbalanced potential of said supply circuit at the load point.

13. In an electrical system, the combination with an unbalanced supply circuit, a local circuit in which is reproduced the electrical conditions of said supply circuit between a given point and the load point, and a regulator connected to said local circuit, of means for impressing upon said circuit one symmetrical component of the unbalanced potential of said supply circuit at the load point, comprising a voltage transformer and associated network connected to the local circuit, a second voltage transformer and network connected in series with a portion of the local circuit and in opposition to the first-mentioned voltage transformer, and a current transformer and associated network for indicating upon said local circuit the same symmetrical component of the unbalanced supply circuit current as the first-mentioned voltage transformer.

14. The combination with a regulator connected to an electrical circuit, of means connected between said regulator and said circuit for actuating the regulator in accordance with a quantity which is one of a set of symmetrical quantities into which the unbalanced voltages of the circuit may be resolved.

15. A regulator adapted for use upon a balanced or an unbalanced circuit comprising a contact-making element and control means therefor, means connected to said circuit for energizing said control means in accordance with a quantity which is one of a set of symmetrical quantities into which the unbalanced voltages of the supply circuit may be resolved.

16. In a voltage regulator adapted for use upon an unbalanced polyphase electrical circuit, the combination with a movable element, of means connected between said regulator and said circuit for actuating said element in accordance with the positive-phase-sequence component of said polyphase electrical quantity.

17. A voltage regulator adapted for use upon an unbalanced circuit comprising a movable element, control means therefor, and means for impressing upon said control means one component of the set of symmetrical components into which the unbalanced voltages of said circuit may be resolved.

18. A voltage regulator adapted for use upon a balanced or an unbalanced circuit comprising a movable element, control means therefor, and means for impressing upon said control means one component of the set of symmetrical components into which the unbalanced voltages may be resolved, said means comprising transformers and resistors and reactors connected to said circuit.

19. In a voltage regulator adapted for use upon an unbalanced electrical circuit, the combination with means for determining the range of operation thereof, of static means whereby said regulator is energized in accordance with the positive-phase-sequence component of the unbalanced electrical quantity.

20. In a voltage regulator adapted for use upon a balanced or an unbalanced circuit, the combination with means for determining the range of operation thereof, of means for actuating said regulator in accordance with one phase-sequence component of the unbalanced electrical quantity comprising a transformer device and impedance devices associated therewith so connected to said circuit as to indicate the desired component.

21. A regulator system for an unbalanced electrical circuit comprising a plurality of impedance devices connected to said circuit and constituting a phase component segregating means, and regulating apparatus controlled thereby.

22. A regulator system for a polyphase electrical circuit comprising a plurality of impedance devices and a transformer connected to said circuit constituting a phase component segregating means, and regulating apparatus comprising movable contact members, control means therefor connected to said segregating means, and operating relays controlled by said contact members.

23. A regulator system for a polyphase electrical circuit comprising a plurality of impedance devices and a transformer connected to said circuit constituting a phase component segregating means, and regulating apparatus comprising a movable element and control means therefor connected to said segregating means.

24. A regulator system for a polyphase electrical circuit comprising a plurality of impedance devices and a transformer connected to said circuit constituting a phase component segregating means, and regulator apparatus comprising movable contact members, control means therefor connected to said segregating means, operating relays controlled by said contact members, and means for determining the range of operation of said regulating means.

25. A regulator system connected to an electrical circuit and adapted to be effective at a point other than the location of the regulator, said system comprising a local circuit having reproduced therein the electrical conditions of the main circuit at a given point, means for impressing upon said circuit the symmetrical components of the unbalanced electrical quantities of said circuit, and regulating means connected to said local circuit.

26. A regulator system adapted for use upon a polyphase circuit and to be effective at the load point comprising means for compensating for the electrical condition of said circuit to the load point, means associated therewith for segregating one component of the unbalanced electrical quantities of said circuit, and voltage-regulating apparatus controlled by said last-mentioned means.

27. A regulator system adapted for use upon a polyphase supply circuit and to be effective at the load point, comprising means for compensating for the electrical condition of the supply circuit at the load point, means associated therewith for segregating one component of the unbalanced electrical quantities of said circuit, and voltage-regulating apparatus comprising a movable member, and control means actuated in accordance with the combined effects of the above-mentioned means.

28. A regulator system adapted for use upon a polyphase circuit and to be effective at the load point comprising means for compensating for the electrical conditions of said circuit at the load point, means associated therewith for segregating one component of the unbalanced electrical quantities of said circuit, and voltage-regulating apparatus comprising vibratory contact members, and operating relays controlled by the operation of said contact members.

29. A voltage-regulator system adapted for use upon a polyphase supply circuit and to be effective at the load point, comprising means for compensating for the electrical condition of the supply circuit at the load point, means associated therewith for indicating one component of the unbalanced electrical quantities of said circuit, and regulating apparatus comprising vibratory contact members, operating relays controlled by the operation of said contact members and means for determining the range of operation of said regulator.

30. A voltage regulator adapted for use upon a polyphase circuit, a control circuit therefor which includes means for compensating for the electrical conditions of said polyphase circuit between the power source and the load point, and means for impressing upon said control circuit one symmetrical component of the unbalanced electrical quantities of said polyphase circuit.

31. The combination with a source of supply, of a regulator comprising contact members, and static means for actuating said members in accordance with one symmetrical component of an electrical quantity of said source of supply.

32. In a regulator system adapted for use upon a polyphase circuit, the combination with a regulator, of static means for actuating said regulator in accordance with the positive-phase-sequence component of a polyphase electrical quantity of said circuit.

33. In a regulator system adapted for use upon a polyphase circuit, the combination with a regulator, of static means for actuating said regulator in accordance with the negative-phase-sequence component of a polyphase electrical quantity of said circuit.

34. In a regulator system adapted for use upon a polyphase circuit, the combination with a regulator, of static means for actuating said regulator in accordance with the positive or the negative-phase-sequence component of a polyphase electrical quantity of said circuit.

35. In a regulator system adapted for use upon an unbalanced electrical circuit, the combination with a regulator, of static means whereby said regulator is actuated from the circuit in accordance with one symmetrical component of a polyphase electrical quantity.

36. In a regulator system adapted for use upon an unbalanced electrical circuit, the combination with a regulator, of means for actuating said regulator, said means comprising electrical circuits having predetermined electrical characteristics whereby said regulator is actuated in accordance with a balanced-phase-sequence component of a polyphase electrical quantity of said circuit.

37. In a regulator system adapted for use upon an unbalanced electrical circuit, the combination with a regulator, of static means for actuating said regulator in accordance with the balanced-phase-sequence component of a polyphase electrical quantity of said circuit.

38. In a regulator system adapted for use upon a polyphase circuit, the combination with a regulator, of means connected between said regulator and the circuit for actuating the regulator in accordance with a quantity which is one of a set of symmetrical quantities into which the unbalanced quantities of the circuit may be resolved.

39. In a regulator system adapted for use upon a polyphase circuit, the combination with a regulator, of means connected between said regulator and the circuit for actuating the regulator in accordance with a quantity which is one of a set of symmetrical quantities into which the unbalanced currents of the circuit may be resolved.

In testimony whereof, I have hereunto subscribed my name this 4th day of April, 1921.

ROBERT D. EVANS.